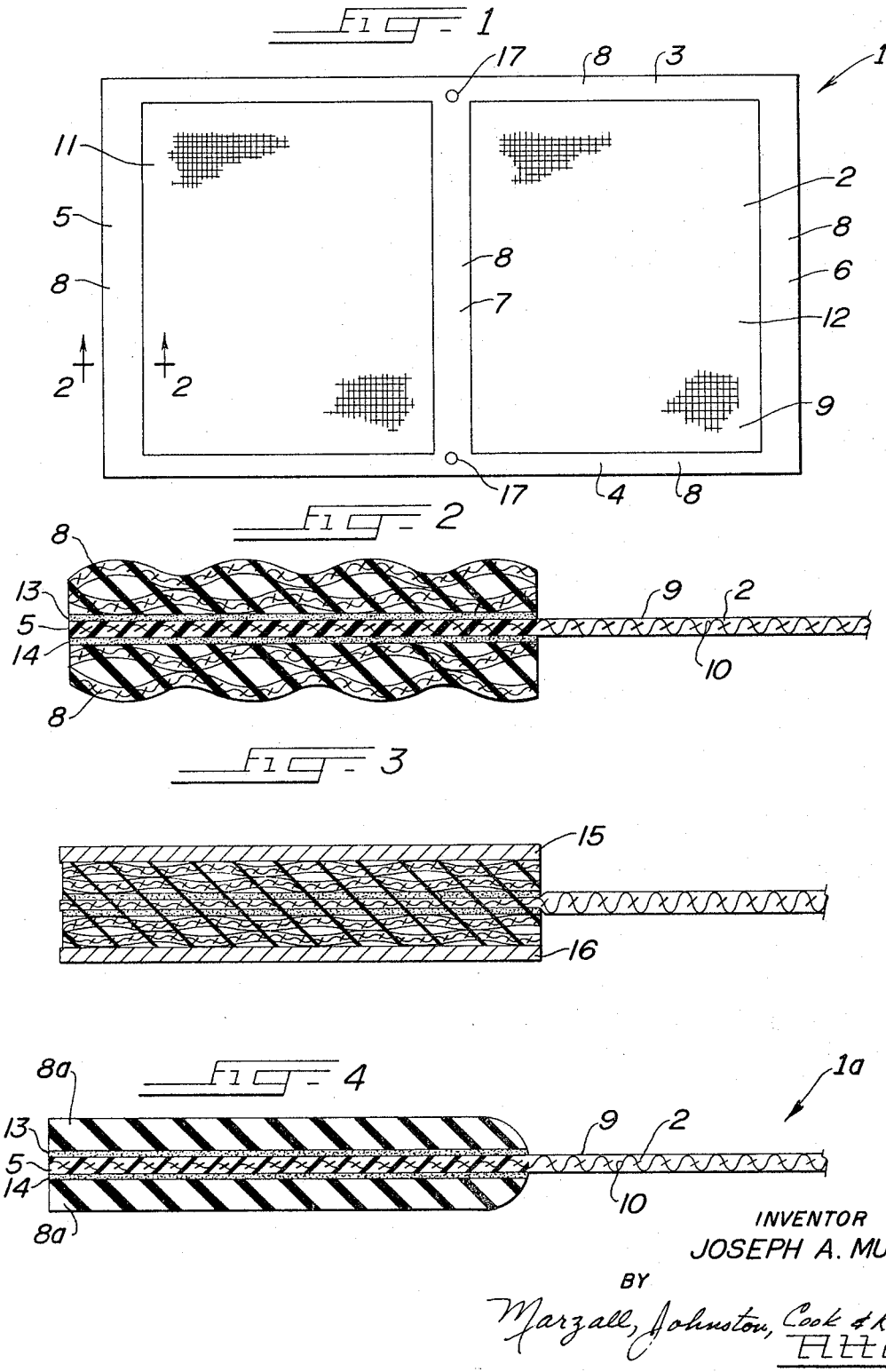

United States Patent Office 3,382,985
Patented May 14, 1968

3,382,985
FILTER ELEMENTS HAVING INTEGRAL GASKET MEANS

Joseph A. Muehl, Milwaukee, Wis., assignor to Pabst Brewing Company, Milwaukee, Wis., a corporation of Delaware Filed Jan. 4, 1966, Ser. No. 518,720
3 Claims. (Cl. 210—495)

ABSTRACT OF THE DISCLOSURE

A filter element embodying a woven cloth body portion having impregnated, liquid impervious supporting portions with resilient gasket strips secured to the respective faces of the supporting portions.

*Background of the invention*

This invention relates to filter elements and, more particularly, to filter elements which are particularly well adapted for commercial use, such as, for example, in filter presses for filtering brewing mash, fruit juices and concentrates, wood and paper pulp, wine, and petroleum, and the like.

It is a primary object of the present invention to afford a novel filter element.

A further object is to enable filter elements to be mounted in filter presses, and the like, in a novel and expeditious manner.

Filter elements for commercial use in filtering mash in breweries, and the like, have been heretofore known in the art. The body portions of such filter elements heretofore known in the art commonly comprise woven cloth. When such previously known filter elements have been operatively mounted in filter presses, and the like, supporting portions thereof, such as, for example, the marginal edge portions thereof, and in some instances, other portions thereof, have been commonly clamped between two portions of the filter frame for supporting the filter element in the frame. When such a filter element is so disposed in a filter frame, it is desirable that no leakage occur between the two aforementioned clamping portions of the frame. Heretofore, to protect against such leakage, the aforementioned clamping portions of such a frame have commonly embodied sealing gaskets, engageable with the opposite faces of the supporting portions of the filter element. Such sealing gaskets have been made of rubber, and the like, and have normally required specially machined, dove-tailed grooves in the clamping portions of such frames for supportingly receiving the gaskets.

Such construction and operation, in the past, has had several inherent difficulties. Thus, for example, the use of rubber gaskets on the clamping portions of the frame has necessitated the repair and replacement of such gaskets at relatively frequent intervals. Also, in many instances, such as, for example, when the filter elements are used for filtering mash, the characteristics of the liquid coming in contact with the clamping surface of the filter frames have caused deterioration and erosion of the gasket grooves, so as to require relative frequent repair thereof and eventual "scrapping" or discarding of the filter frames. It is an important object of the present invention to overcome such difficulties and disadvantages in a novel and expeditious manner.

Another object of the present invention is to enable a novel filter element to be afforded, which embodies a body portion of woven cloth, and embodies as an integral part thereof resilient gaskets or sealing strips constituted and arranged in a novel and expeditious manner.

Another object is to enable filter elements, embodying a body portion of woven cloth, to be effectively and sealingly held in a novel and expeditious manner between flat, smooth clamping surfaces of such a filter press, or the like, without the necessity of gaskets being mounted on or in the aforementioned surfaces of the press.

Yet another object of the present invention is to eliminate the necessity of maintaning and replacing filter-engaging gaskets as a part of filter presses, and the like.

A further object is to afford, in a novel and expeditious manner, a fresh sealing gasket for each new filter element.

Another object of the present invention is to eliminate the necessity for, and the cost of providing and maintaining, gasket grooves in filter frames, and the like.

Another object is to afford a longer life expectancy for filter frames, and the like, by eliminating therefrom the primary wear point, namely, the gasket grooves commonly embodied in filter frames heretofore known in the art.

Another object is to enable filter frames, which have been previously "scrapped" or discarded because of eroded gasket grooves, to be effectively and efficiently reused.

A further object is to afford a novel filter element of the aforementioned type which is practical and efficient in operation and which may be readily and economically produced commercially.

Other and further objects of the present invention will be apparent from the following description and claims and are illustrated in the accompanying drawings which, by way of illustration, show the preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

*Description of the drawings*

In the drawings:

FIG. 1 is a top plan view of a filter element embodying the principles of the present invention;

FIG. 2 is a greatly enlarged, fragmentary detail sectional view taken substantially along the line 2—2 in FIG. 1;

FIG. 3 is a view similar to FIG. 2, showing the filter element portion of FIG. 2 clamped between the clamping surfaces of a filter frame; and FIG. 4 is a view similar to FIG. 2, but showing a modified form of the present invention.

*Description of the embodiments shown herein*

A filter element 1, embodying the principles of the present invention, is shown in FIGS. 1–3 of the drawings to illustrate the presently preferred embodiment of the present invention.

The filter element 1 shown in the drawings is rectangular in shape and embodies, in general, a body portion 2 having two longitudinal edge portions 3 and 4, two end marginal edge portions 5 and 6, and a centrally disposed transverse portion 7, each portions 3–7 affording a supporting portion adapted to be clamped between clamping elements of a filter frame, or the like, for supporting the filter element 1 in filtering position. The filter element 1 also includes elongated resilient gaskets or sealing strips 8 extending along and secured to each of the supporting portions 3–7 on both the upper face 9 and the lower face 10 of the body portion 2.

With the filter element 1 constructed in the manner disclosed herein, the body portion 2 affords two filtering areas or panels 11 and 12 for performing filtering operations, the panel 11 being defined at its outer marginal edge portions by the supporting portions 3, 4, 5, and 7 of the body portion 2, and the panel 12 being defined at its outer marginal edge portions by the supporting portions 3, 4, 6, and 7 of the body portion 2.

The body portion 2 of the filter element 1 is preferably constructed of a sheet of woven cloth material. In the preferred form of the present invention the cloth from which the body portion 2 is formed is preferably of the monofilament type, and is preferably woven from polypropylene fibers. However, other suitable types of woven cloth and other types of fibers, such as, for example, fiber glass, cotton or other suitable natural fibers, suitable metal fibers such as stainless steel, or suitable synthetic fibers such as nylon, acrilon or polyurethane, and the like, may be used without departing from the purview of the broader aspects of the present invention.

Preferably, the supporting portions 3–7 of the body portion 2 of the filter element 1 are impregnated with a suitable sealing material, such as, for example, liquid latex made of natural rubber or synthetic elastomers, to such an extent that the supporting portions 3–7 are sealed against the passage of liquid therethrough, for a purpose which will be discussed in greater detail presently.

The gaskets 8 of the filter element 1 preferably comprise strips of spongy or resilient woven cloth formed from polypropylene fibers. The weave of the cloth from which the gaskets 8 are formed are preferably of the relatively highly resilient or spongy weaves, such as the waffle weave, trilock weave, or honeycomb weave, and the like, which are well known in the trade. The cloth of the preferred form of the gaskets 8 is impregnated with a suitable sealing material, such as the aforementioned liquid latex made of natural rubber or synthetic elastomers, to an extent sufficient to seal them against the passage of liquid therethrough.

Preferably, the gaskets 8 are adhesively secured to the respective upper and lower faces of the supporting portions 3–7 of the body portion 2 by heat sealing or by suitable adhesives, such as, for example, epoxy adhesives, liquid neoprene, or liquid latex, and the like. However, if desired, the gaskets 8 may be secured to the body portion 2 by other means, such as, for example, by sewing them to the body portion 2 with a suitable thread, such as polypropylene thread.

In FIG. 2 of the drawings, layers of adhesives 13 and 14 more or less diagrammatically, are shown disposed between the upper and lower faces 9 and 10 of the body portion 2 and the respective gaskets 8 secured thereto. However, it is to be appreciated that this is merely by way of illustration and not by way of limitation, and is merely intended to indicate the preferred adhesive securing of the gaskets 8 to the body portion 2, whether the adhesion is obtained by heat sealing or by a separate adhesive.

In the use of the filter element 1 shown in the drawings, it may be disposed in a suitable filter frame, or the like, in such position that each of the supporting portions 3–7 are disposed between an upper clamping member 15 and a lower clamping member 16, FIG. 3. If desired, locating holes or openings 17 may be afforded in the marginal edge portions of the filter element 1 in spaced relation to the filtering panels or areas 11 and 12, for engagement by locking pins, not shown, in the filter frame, to thereby assist in the proper locating of the filter element 1 in such a filter frame.

After the filter element 1 has been thus disposed in such a filter frame, the clamping members 15 and 16 thereof may be brought together into position to firmly clamp therebetween the supporting portions 3–7 of the body portion 2 and the gaskets 8 disposed thereon. When the clamping members 15 and 16 are so disposed in operative supporting relation to the filter element 1, they are effective to hold the supporting portions 3–7 against lateral movement and are effective to support the filter element 1 in operative filtering position in the frame.

The filter element 1 shown in the drawings is rectangular in shape, and is divided transversely into two filtering areas or panels 11 and 12. It will be appreciated that this is merely by way of illustration and not by way of limitation, and that the shape of the filter element 1 and the arrangement of the supporting portions thereof, such as, for example, so as to afford only one filtering area, such as either the area 11 or the area 12, may be changed without departing from the purview of the present invention.

The aforementioned clamping of the gasket-covered supporting areas 3–7 of the filter element 1 between clamping members, such as the members 15 and 16, FIG. 3, somewhat compresses the gaskets 8 and the supporting portions 3–7, and insures a positive engagement between the gaskets 8 and the adjacent surfaces of the clamping members 15 and 16. With this construction of the filter element 1, and with it so disposed between clamping members, such as the members 15 and 16, effective assurance is afforded against the leakage of liquid through the supporting portions 3–7, through the gaskets 8, and between the gaskets 8 and the clamping members 15 and 16. This is true even when the clamping surfaces of the members 15 and 16, which engage the gaskets 8 are smooth.

With such a filter element construction, the need for specially grooved or specially gasketed clamping members in filter frames, and the like, is completely eliminated. So, also, the necessity for expensive construction and maintenance of clamping members in filter frames, and the like, is eliminated by my novel filter element construction.

While it is preferred that the gaskets 8 be constructed of a resilient or spongy woven cloth material, impregnated with a suitable sealing material, it will be appreciated that the present invention is not limited thereto and that other suitably impregnated materials such as impregnated built-up cotton, felt, or other natural fibers may be used without departing from the purview of the broader aspects of the present invention.

A modified form of filter element 1a is shown in FIG. 4 of the drawings. The filter element 1a is of the same construction as the preferred form of filter element 1 shown in FIGS. 1–3, except for the gasket material, and parts shown in FIG. 4 which are the same as parts shown in FIGS. 1–3 are indicated by the same reference numerals, and parts which are similar to but have been substituted for corresponding parts in FIGS. 1–3 are indicated by the same reference numerals with the suffix "a" added thereto.

It will be noted that the filter element 1a shown in FIG. 4 embodies a woven cloth body portion 2 having gaskets 8a secured to the upper and lower faces of all of the supporting portions thereof, as illustrated in FIG. 4 with respect to the supporting portion 5. The gaskets 8a of the filter element 1a are constructed of natural or synthetic rubber, and preferably are constructed of foam rubber. They may be secured to the respective supporting portions, such as the supporting portion 5, by suitable adhesives 13 and 14, such as, for example, an epoxy adhesive disposed between the upper and lower surfaces 9 and 10 of the body portion 2 and the adjacent surfaces of the respective gaskets 8a disposed in juxtaposition thereto.

The mode of operation and the use of the filter element 1a is identical to that hereinbefore described with respect to the filter element 1, the supporting portions of the body portion 2 of the filter element 1a, like the corresponding supporting portions of the filter element 1 preferably being impregnated with a suitable sealing material such as the aforementioned liquid latex. The filter element 1a may be mounted in a filter frame, or the like, in the same manner as heretofore discussed with respect to the filter element 1, and when the filter element 1a is so mounted in a filter frame, or the like, effective assurance is afforded against the leakage of liquid through the supporting portions 3–7 thereof, the gaskets 8, and between the gaskets 8 and the clamping surfaces of the filter frame.

From the foregoing, it will be seen that the present invention affords a novel filter element embodying gaskets constituted and arranged in a novel and expeditious manner on the body portion thereof.

In addition, it will be seen that the present invention enables novel filter elements to be afforded wherein body portions constructed of woven cloth have gaskets embodied thereon in a novel and expeditious manner.

In addition, it will be seen that the present invention enables the gaskets embodied in the clamping surfaces of filter frames heretofore known in the art for use in filters for brewing mash, fruit juices and concentrates, wood and paper pulp, wine, and petroleum, and the like, to be eliminated.

Also, it will be seen that the present invention enables a fresh, new sealing gasket to be afforded with each filter element.

Also, it will be seen that the present invention affords a novel filter element which is practical and which may be economically used commercially.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A filter element in a filter frame, said frame having oppositely disposed substantially smooth surfaces clampingly engaged with respective opposite sides of said filter element for operatively supporting said filter element in filtering position, said filter element comprising
   (a) a woven cloth body portion having
      (1) two oppositely disposed faces, and
      (2) supporting portions disposed in position to be so clamped between said surfaces,
   (b) said supporting portions being so impregnated with a sealing material as to seal them against the passage of liquid therethrough, and
   (c) resilient gasket means adhesively secured to said faces of said supporting portions for engagement by said surfaces,
   (d) said gasket means
      (1) comprising strips of spongy interwoven fabric impregnated with a liquid sealing material mounted on respective ones of said faces, and
      (2) being of such construction and being so disposed on said faces of said supporting portions and coacting with said frame so as to prevent the passage of liquid
         (a) through said gasket means,
         (b) between said strips and the respective said faces on which they are mounted, and
         (c) between said gasket means and said surfaces, when said filter element is so clampingly engaged by the filter frame.

2. A filter element as defined in claim 1, and in which
   (a) said body portion comprises a sheet of cloth woven from fibers of polypropylene,
   (b) said supporting portions of said cloth are impregnated with liquid latex,
   (c) said strips of said gasket means comprise spongy woven polypropylene cloth
      (1) having a thickness several times greater than the thickness of said first mentioned cloth, and
      (2) impregnated with liquid latex, and
   (d) said strips of said gasket means are adhesively secured to said supporting portions.

3. A filter element as defined in claim 1, and in which
   (a) said supporting portions of said cloth and said strips are impregnated with liquid latex.

References Cited

UNITED STATES PATENTS

| | | | |
|---|---|---|---|
| 2,127,397 | 8/1938 | Freedlander | 210—445 |
| 2,147,792 | 2/1939 | Knight | 210—445 |
| 2,153,664 | 4/1939 | Freedlander | 210—445 |
| 2,640,789 | 6/1953 | Hausner | 210—499 |
| 3,084,987 | 4/1963 | Bounin | 210—401 |

REUBEN FRIEDMAN, *Primary Examiner.*

W. S. BRADBURY, *Assistant Examiner.*